(12) United States Patent
Merk et al.

(10) Patent No.: US 8,219,245 B2
(45) Date of Patent: Jul. 10, 2012

(54) ARTICULATED ARM ROBOT

(75) Inventors: Günther Merk, Augsburg (DE);
Joachim Markert, Augsburg (DE);
Rainer Krumbacher, Rettenbach a. A. (DE)

(73) Assignee: Kuka Roboter GmbH, Augsburg (DE)

( * ) Notice: Subject to any disclaimer, the term of this patent is extended or adjusted under 35 U.S.C. 154(b) by 1346 days.

(21) Appl. No.: 11/383,327

(22) Filed: May 15, 2006

(65) Prior Publication Data

US 2007/0265731 A1  Nov. 15, 2007

(51) Int. Cl.
*B25J 19/00* (2006.01)
*B25J 18/00* (2006.01)
*G05B 19/18* (2006.01)

(52) U.S. Cl. .............. 700/250; 700/245; 901/2; 901/19; 318/568.24

(58) Field of Classification Search .................. 318/563, 318/568.24, 565, 568.11, 564; 901/9, 19, 901/49, 2, 23, 24; 74/490.01, 490.03, 490.05, 74/490.07, 490.1, 661, 665 A, 665 E; 714/25; 700/3, 9, 108, 245, 250, 254; 701/3
See application file for complete search history.

(56) References Cited

U.S. PATENT DOCUMENTS

| | | | |
|---|---|---|---|
| 4,489,377 A * | 12/1984 | Mawyer et al. | 700/178 |
| 4,490,660 A * | 12/1984 | Tsuchihashi | 700/255 |
| 4,560,895 A * | 12/1985 | Zahner | 310/77 |
| 5,214,749 A | 5/1993 | Brown | |
| 5,245,263 A | 9/1993 | Tsai et al. | |
| 5,272,648 A * | 12/1993 | Yoshida et al. | 700/302 |
| 5,305,652 A * | 4/1994 | Zimmer | 74/490.01 |
| 5,332,181 A * | 7/1994 | Schweizer et al. | 248/123.11 |
| 5,901,613 A * | 5/1999 | Forslund | 74/490.03 |
| 6,237,730 B1 | 5/2001 | Dropmann et al. | |
| 6,563,281 B1 | 5/2003 | Ramstroem et al. | |
| 7,093,497 B2 | 8/2006 | Takenaka et al. | |
| 2004/0103742 A1* | 6/2004 | Tesar | 74/490.03 |
| 2004/0143951 A1* | 7/2004 | Berninger | 29/428 |
| 2004/0244505 A1 | 12/2004 | Takenaka et al. | |
| 2006/0061316 A1* | 3/2006 | Aihara et al. | 318/568.12 |
| 2006/0113933 A1* | 6/2006 | Blanding et al. | 318/116 |
| 2008/0277552 A1* | 11/2008 | Duval | 248/280.11 |

FOREIGN PATENT DOCUMENTS

| | | |
|---|---|---|
| DE | 2841183 A1 | 4/1980 |
| DE | 19718294 A1 | 12/1998 |
| DE | 197 33 169 A1 | 2/1999 |
| DE | 60010649 T2 | 5/2005 |

(Continued)

OTHER PUBLICATIONS

Hooper, et al., "Implementation of a four-level mechanical architecture for fault-tolerant robots" Reliability Engineering and System Safety, vol. 53 (1996) p. 237-246.*

*Primary Examiner* — Thomas Black
*Assistant Examiner* — Christine Behncke
(74) *Attorney, Agent, or Firm* — Schiff Hardin LLP

(57) ABSTRACT

To increase the safety of an articulated arm robot with robot members connected by means of joints as open kinematics and with functional elements acting on the joints, such as drive motors, gears, brakes and a weight balance system, while reducing the mechanical limitations of the motion space of the robot, the present invention provides that at least some of the said functional elements have a dual design.

5 Claims, 5 Drawing Sheets

FOREIGN PATENT DOCUMENTS

| | | |
|---|---|---|
| DE | 202004020863 U1 | 5/2006 |
| EP | 0 554 711 A1 | 8/1993 |
| EP | 0 947 296 A2 | 10/1999 |
| EP | 1 475 193 A1 | 11/2004 |
| FR | 2 608 959 A1 | 7/1988 |
| SE | WO 00/43170 | 7/2000 |

* cited by examiner

ARTICULATED ARM ROBOT

The present invention pertains to an articulated arm robot with robot members connected by means of joints and with functional elements acting on the joints.

Current robot mechanisms, as on articulated arm robots, are usually embodied as open kinematic chains in all axes. This design makes possible a high mobility at low costs. However, the respective components, such as motors, gears and structural parts, are usually embodied only in a simple manner. Thus, if one of these components fails, then this inevitably leads to damage. In addition, it is usually not possible to determine the source of the error beyond doubt. Due to continuous improvement, complete failures of the robots are currently rare, and this residual risk is absolutely defensible within the framework of an industrial application. Personal injuries are avoided here by means of the exclusion of people from the working area of the robot. However, in applications, in which people are moved by the robot (e.g., in the form of a driving business), a higher degree of safety is required.

Currently existing systems of this type make provisions that all components are designed with a corresponding safety in order to avoid a failure. The quality of the structural parts is guaranteed by means of corresponding testing measures, e.g., ultrasound examination or x-ray examination. In components such as gears, it can be guaranteed by means of calculation that the axes do not break into individual parts due to damage; however, because of the complexity of the components, absolute safety against the free full rotation of the axes cannot be guaranteed. This applies similarly to the motors and blocking brakes of the robot. Therefore, the installation site, angle between axes and limit stop buffer of these machines are designed such that the passengers themselves cannot collide with the surrounding periphery in case of a failure of a motor and a gear and the motion with a permissible acceleration is caught by the buffer. Thus, the robot is a safe system. However, the working area must be severely restricted for this, so that the possibilities of motion opposite a normal robot are extremely restricted. This restriction is so severe that the robot can be used only on a limited basis for many areas of passenger transport. For this reason, a manipulation is necessary, which reliably recognizes any source of error and can stop the motion without putting the passengers at risk. Besides the manipulation, a corresponding evaluation of the sensor signals also takes place.

On the other hand, the basic object of the present invention is to increase the safety while reducing the mechanical limitations of the working area with an articulated arm robot, in particular for the transport of people, such as driving business, simulator or the like.

According to the present invention, the said object is accomplished with an articulated arm robot of the type described in the introduction in that functional elements have a dual design.

Functional elements are especially drive motors, gears, blocking brakes as well as weight balance systems. While these have only a simple design in conventional robots on each joint between two robot members connected to one another in the kinematic chain, which is relatively cost favorable, the present invention provides, for increasing safety, that corresponding functional elements have a dual and thus redundant design. It has turned out that the probability of the (almost) simultaneous failure of two redundant functional elements is so minimal that it can be disregarded.

According to a preferred embodiment of the present invention, it is provided that drive motors, as functional elements, have a dual design, whereby a motor current monitoring is also provided. The motor current is monitored continuously by the motor signals of the motors being continuously evaluated, so that the failure of a motor is immediately recognized based on the actual values of the motor current deviating from set values. The robot can then be shut down and the motor can be replaced.

Provisions are made in a variant that distance sensors for position determining are provided on the motor.

In the same way, a variant according to the present invention provides that gears, as functional elements, have a dual design. The gears are designed in such a way that if one gear fails, the motors and brakes can safely shut down the robot via the other gear.

In a variant of the present invention, it is provided that blocking brakes, as functional elements, have a dual design, whereby especially the robot is reliably stopped and held in any position even in case of a power outage. In this connection, a monitoring means for the cyclic monitoring of the blocking brakes is preferably provided. The testing of the brakes can be carried out, for example, regularly before or after an operating cycle, such as a drive cycle in a robot embodied as a driving business or acting as a simulator, or else at least daily. To this end, the robot axes are moved slowly, and the brakes are closed one after the other individually and then opened again. The available brake torque can be recognized at the motor current of the respective axis. If a brake should lie outside of the tolerance ranges, then it is to be replaced before starting up the robot.

In another preferred embodiment, it is provided that sensors have a redundant design. Wherever sensors are arranged, at least two are provided, whereby sensors that are identical or also work on different principles can be used, so that a redundancy of the error detection is consequently given.

Other preferred embodiments of the present invention provide for a weight balance system to have a redundant design. Weight balance systems may be embodied in the form of springs, such as hydraulic, pneumatic or mechanical springs. These [springs] are arranged in parallel next to one another, so that a safety redundancy is also consequently brought about. At least one and possibly a plurality of sensors for checking the operating ability of the springs are provided at each of same. In case of fluid-based balance systems, such as hydropneumatic systems, pneumatic or hydraulic systems, the checking is carried out especially by means of two redundant pressure sensors. If the filling pressure is exceeded, and also if the two sensors have a different display, the entire system is shut down. The weight balance system is designed in such a way that each of its parallel units can stop the motion of the robot member about the associated axis, especially the rocker of axis A2 of the robot, if the other unit fails.

Distance sensors for determining the position of the axis are preferably designed as absolute value transducers. They may be provided on the input end and on the output end. Thus, the complete drive line of the robot is checked for errors. If one or both distance signals deviates from the set value, the robot is shut down. In the embodiment as an absolute value transducer, the adjustment of the robot axis can also be checked.

In a preferred embodiment, robot members connected by means of joints are arranged in the form of an open kinematic chain. Provisions may also be made for the robot members to be arranged at least in parallel in the form of a closed kinematic chain.

For additionally increasing the safety brought about by means of the redundant design of individual functional elements and/or sensors, provisions are made in a variant of the present invention for a comparison of the actual values of the positions of axes determined by the distance sensor(s) with predetermined or preset set values. If a deviation of the actual values from the set values outside of set tolerance limits is detected, the system is stopped within a defined safety space. In a preferred embodiment, the tolerance limits are determined by including predetermined tolerance ranges of individual functional elements, such as motors, brakes or weight balance systems. In this case, set values in the form of an ideal path curve of the robot motion within the framework of a computer simulation, such as an emergency stop simulation, can be calculated, in which parameters, such as velocity, acceleration, load and robot position are taken into consideration. By including the individual tolerance ranges of the functional elements and/or of other failure scenarios within the robot system and the thereby accompanying changes in the simulated path curves, maximum deviations from an ideal path curve, especially the maximum slowing-down path in an emergency stop event, can be determined with sufficient accuracy. For example, the thus determined safety spaces, which are to be complied with for guaranteeing safety between the robot and the robot environment, are formed in the form of a flexible tube enveloping the ideal path curve, in the interior space of which [flexible tube] the robot stops safely under all possible driving conditions and with consideration of all safety-related parameters. The safety spaces are preferably expanded for further increasing the safety by means of admission of interfering contours of a load or necessary safety distances to the environment.

"Displacement pick-ups for determining the axis position can likewise be made redundant and they preferably comprise a combination of relative and absolute displacement pick-ups. They are arranged on the drive side and the driven side. The complete drive line of the robot is thus checked for errors. When one or both displacement signals deviate from the desired value, the robot is stopped. By using at least one absolute value pick-up per axis, the adjustment of the robot axes can be checked as well. The system is stopped in case of incorrect values or values that deviate from one another."

It is achieved by means of the present invention not only that any possible error is reliably detected, but also that, in case of an error, any risk, especially to people, people transported by robot, is ruled out.

Other preferred embodiments of the present invention appear from the claims and the following description, in which an exemplary embodiment of an articulated arm robot is explained with reference to parts of a drawings [sic] showing such. In the drawings:

Figure 1:
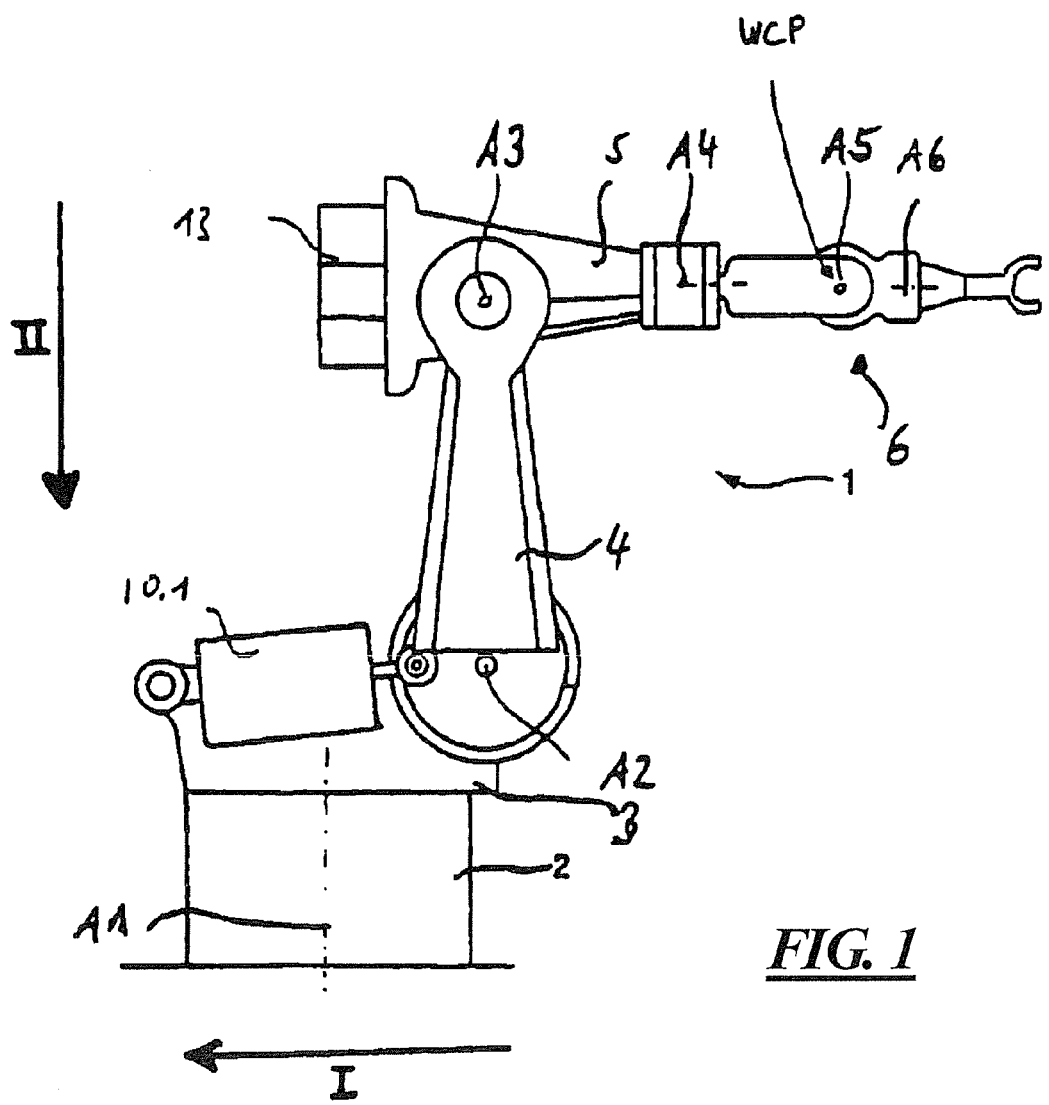
FIG. 1 shows a lateral view of an articulated arm robot.

An articulated arm robot 1 has a base 2, a carrousel 3 located on this [base] and rotatable about the first axis A1, a rocker 4 pivotable on this [carrousel] and pivotable about a second axis A2 that is usually arranged at right angles to the axis A1, a robot arm 5 connected thereto, usually pivotable about an axis A3 that is parallel to the axis A2, as well as a hand 6 arranged rotatably about a fourth axis A4, which has other parts rotatable about two axes A5 and A6 for guaranteeing a full mobility.

The carrousel 3 and the rocker 4 are usually connected by means of a weight balance system 10.1 for releasing the motor moving the rocker.

Figure 2:
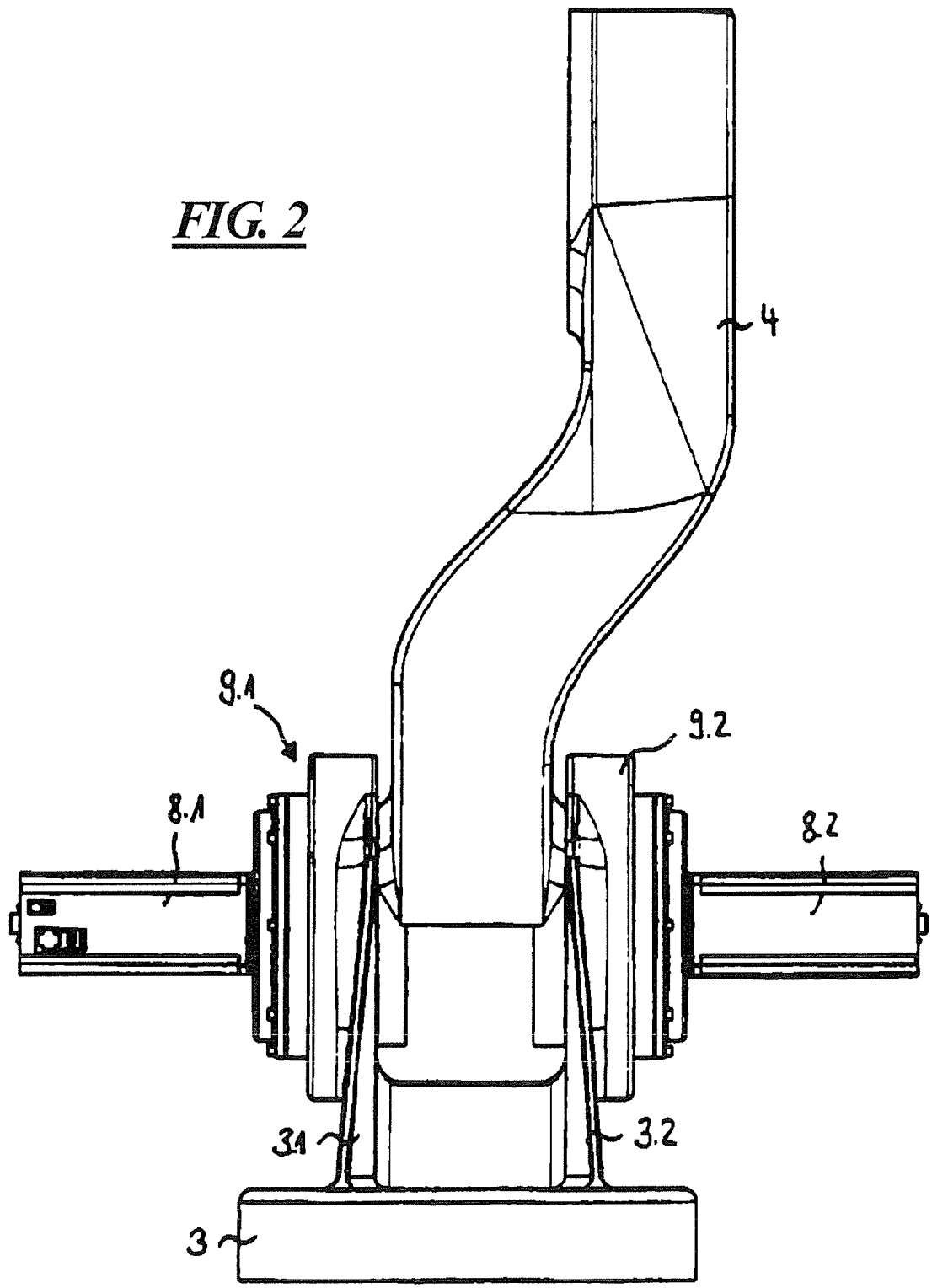
FIG. 2 shows a front view of the carrousel and rocker of such a robot in the direction of the arrow I of FIG. 1.

FIG. 2 shows the carrousel 3 and the rocker 4. On the carrousel 3 are provided two struts 3.1, 3.2, between which the rocker 4 is held and on which are provided, according to the present invention, a first motor 8.1 and a second motor 8.2 each with a gear 9.1, 9.2, each on the outside, on the side facing away from the rocker. In this way, the drive elements for the rocker have a dual and thus redundant design.

Figure 3:
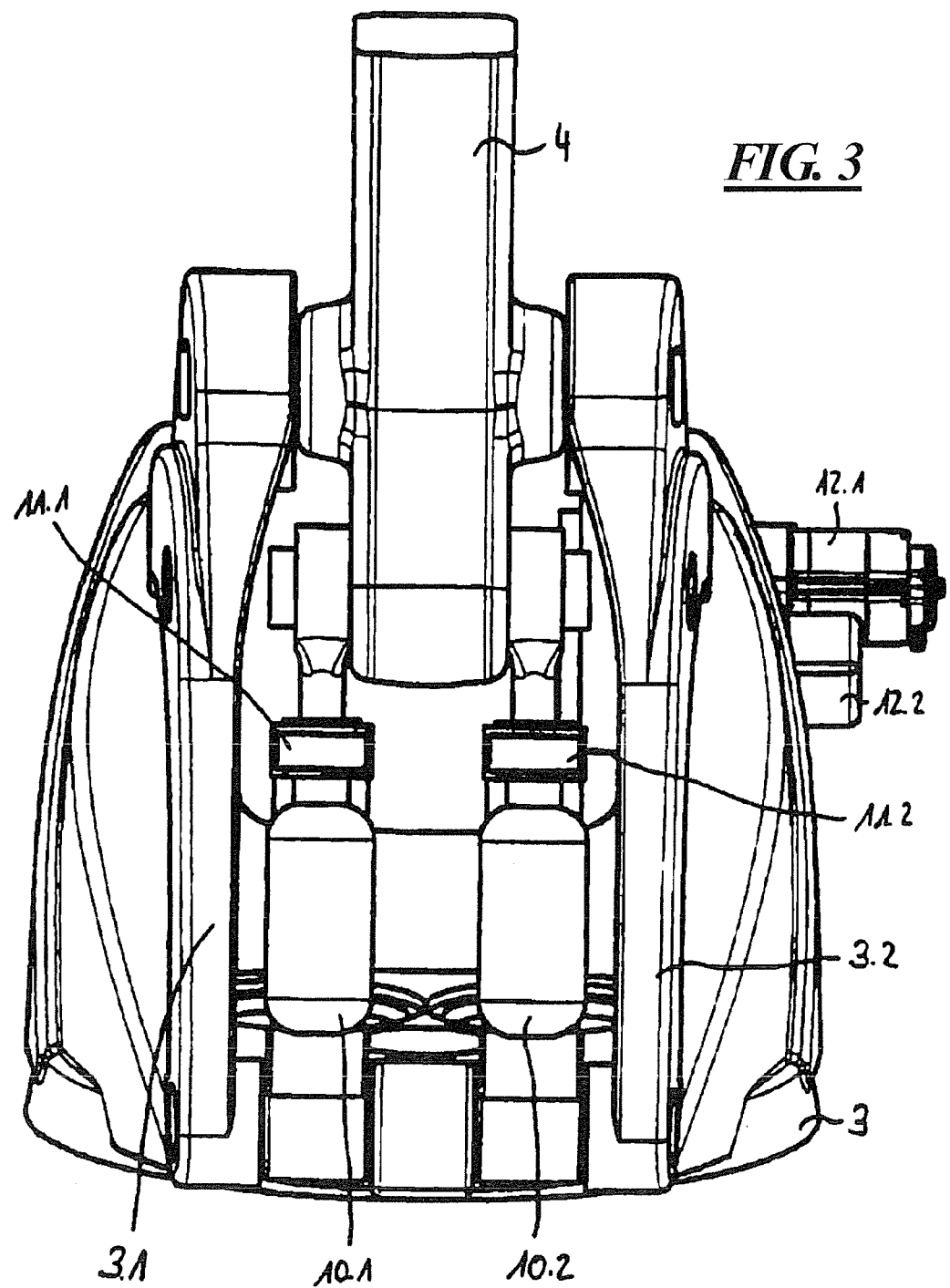
FIG. 3 shows a view of the carrousel and rocker, including a rear view of a weight balance system arranged between this [sic] corresponding to the arrow II of FIG. 1.

FIG. 3 shows a corresponding redundant design for weight balance systems as well as the brake system for the rocker 4. The weight balance system consists of two springs 10.1, 10.2, such as hydropneumatic, hydraulic or pneumatic springs. Each of the springs is provided with a monitoring sensor 11.1, 11.2. Moreover, on the right-hand side in FIG. 3, brakes 12.1, 12.2 are provided, both of which act on the rocker 4 and can brake same. Instead of a one-sided arrangement of the brakes 12.1, 12.2, these may also be arranged symmetrically on both sides of the rocker 4.

Figure 4:
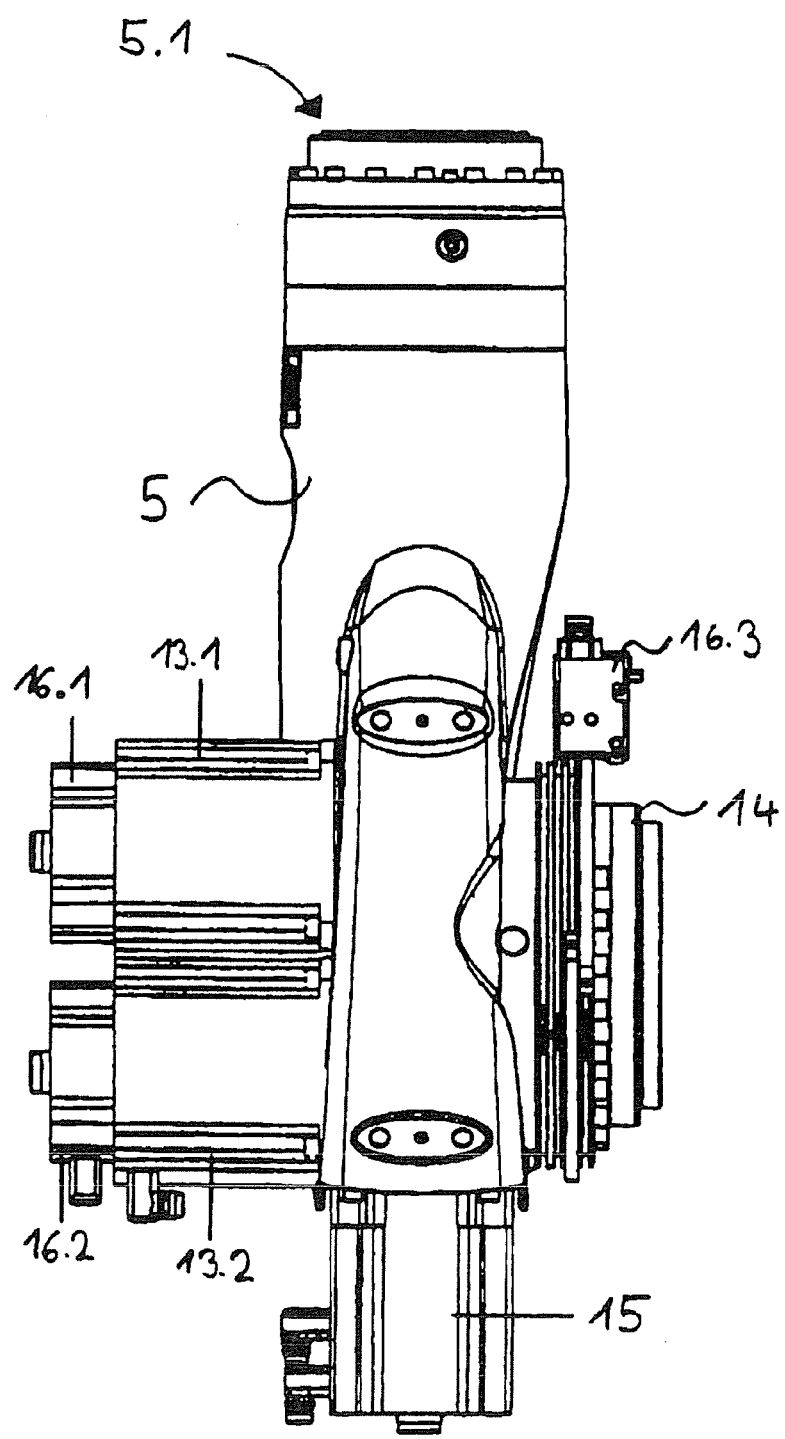
FIG. 4 shows the view of sensors at a robot arm.

FIG. 4 shows a top view of a robot arm 5. The dual-designed drive motor 13.1, 13.2 for the robot arm is shown on the left-hand side, while the gear 14, via which it [drive motor] can be connected to the rocker 3 [sic-Tr.Ed.] (FIGS. 1 through 3), is shown on the right-hand side. Motors for the hand axes of the robot, of which only the topmost motor can be seen and which act via rods on hand elements to be arranged on the free ends 5.1 of the arm 5, are arranged on the rearward (lower) end of the robot.

Two distance sensors 16.1, 16.2 are shown which monitor the motions of the robot arm 5 in relation to the rocker on the input end. Another distance sensor 16.3 is provided for the monitoring of the robot arm motion on the output end, as a result of which an additional redundancy is brought about and the whole drive line is monitored.

Figure 5:
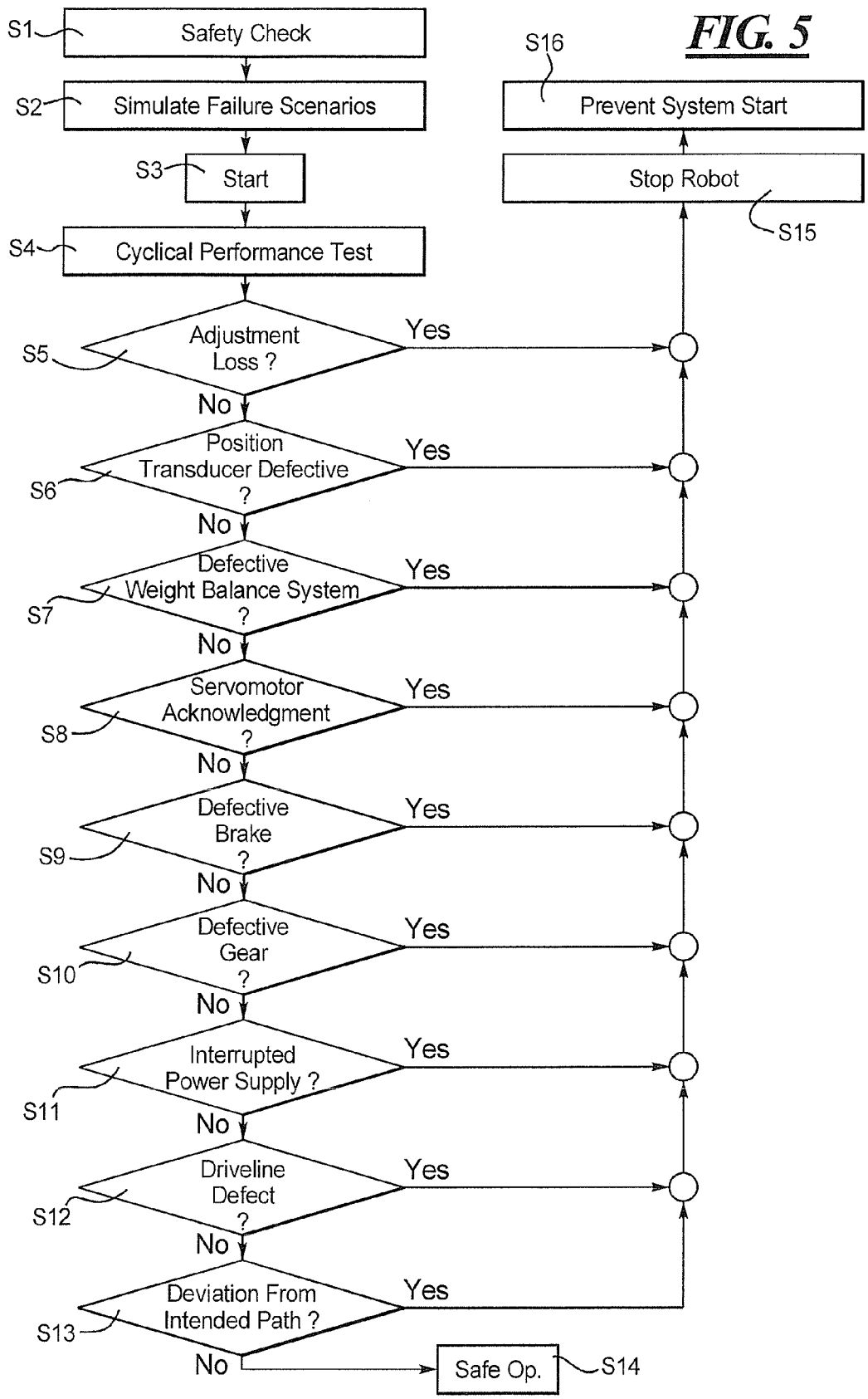
FIG. 5 shows a flow chart of a process for monitoring errors according to the present invention.

FIG. 5 shows a flow chart of a process according to the present invention for monitoring of errors and for additionally increasing the safety brought about by means of individual functional elements of redundant design and/or sensors. Before the actual startup of the robot according to the present invention, simple mechanical elements, such as structural parts and screw couplings, are checked for safety by means of calculations with sufficiently high safety factors in step S1. A mechanical check will be also additionally be carried out. Furthermore, the robot path is simulated, within the framework of an emergency stop simulation, in which all possible failure scenarios of individual functional elements and/or sensors are also included with regard to their cooperation, in step S2 before the use thereof. By means of such a simulation, the required safety spaces with regard to the environment of the robot are known during the startup thereof and may accordingly be considered in the system layout.

In step S3 the robot system can now be started. A performance test of individual functional elements and/or sensors, as a result of which especially a failure of more than one component per run is avoided, is carried out at cyclical intervals in a respective step S4. Such a performance test may be carried out, for example, on the individual brakes or in the form of a pressure test on the weight balance system.

Provisions are especially made for determining an error in the form of an adjustment loss of the said robot members or joints (step S5) or of a defective position transducer (step S6), whereby the error will be reported and a shutdown will be affected upon the sending of incorrect or unrealistic values at the position transducer.

Furthermore, an error may be present in the form of a defective weight balance system, which can be determined, for example, by means of the pressure sensors of redundant design (step S7), in the form of a defective motor, whereby the error can be detected by means of acknowledgment of the servomotor (step S8), or in the form of one or more defective brakes (step S9), or one or more defective gears (step S10), whereby a lengthening of the stopping path or a blocking in case of the further startup of the robot is established in the latter cases.

Other possible sources of errors to be determined include an interrupted power supply (step S11), whereby a blocking in case of further startup and a stopping by means of permanent magnet brakes are also carried out here, or another defect in the driveline (step S12) with a thereby accompanying blocking or a possible lengthening of the stopping path, or the robot leaving the path provided (step S13), which can be determined from a deviation between determined values of the position transducer/transducers and the robot path simulated beforehand.

If all error pollings carried out in steps S5 through S13 are negative, a safe operation of the robot can be assumed and the startup of the robot can be continued in step S14.

If, however, an error source is determined during the running of the error pollings S5 through S13, the robot is immediately stopped in step S15 within the safety spaces, without exceeding the permissible acceleration.

Thus, a reliable stopping of the robot or the prevention of a system start in case of an error can be assumed in step S16 with the highest safety requirements.

LIST OF REFERENCE NUMBERS

1 Articulated arm robot
2 Base
3 Carrousel
3.1, 3.2 Struts
4 Rocker
5 Robot arm
5.1, 5.2 Ends
6 Hand
8.1, 8.2 Motor
9.1, 9.2 Gear
10.1, 10.2 Springs
11.1, 11.2 Monitoring sensor
12.1, 12.2 Brakes
13.1, 13.2 Drive motor
14 Gear
16.1, 16.2, 16.3 Distance sensor
S1-S16 Process steps

The invention claimed is:

1. An articulated arm robot comprising:
a robot arm comprising a plurality of articulated robot members that operate safely dependent on a plurality of different functions;
a plurality of different pairs of redundant components, each different pair of redundant components being respectively associated with one different function among said plurality of different functions, and each redundant component in each of said redundant pairs being operable by itself to perform the function associated with that pair of redundant components;
said plurality of pairs of redundant components comprising a pair of redundant drive motors that each perform, by itself, one of said functions, and a pair of redundant gears that each perform, by itself, one of said functions, and a pair of redundant blocking brakes that each perform, by itself, one of said functions, and a plurality of redundant weight balance systems that each perform, by itself, one of said functions; and
a monitoring system configured to detect continued occurrence of each of said plurality of functions during operation of said robot arm, and configured to automatically stop operation of said robot arm upon an absence of any of said functions being detected during said operation of said robot arm.

2. An articulated robot arm as claimed in claim 1 wherein each weight balance system comprises at least two springs operating in parallel.

3. An articulated robot arm as claimed in claim 1 comprising, for each of said functions, a sensor that monitors that function and supplies a signal to said monitoring system indicating continued occurrence of the function monitored by that sensor.

4. An articulated robot arm as claimed in claim 3 comprising, for each of said sensors, a redundant sensor that monitors the same one of said functions.

5. An articulated robot arm as claimed in claim 3 wherein at least one of said sensors is a transducer that determines relative positions of said articulated robot members.

* * * * *